July 2, 1968    J. C. QUADY ETAL    3,390,655

PATROL CRAFT

Filed Jan. 17, 1967    5 Sheets-Sheet 1

INVENTORS.
JOHN C. QUADY,
GEORGE H. SCHILLREFF,
By L.E. Carnahan
AGENT.

July 2, 1968  J. C. QUADY ET AL  3,390,655
PATROL CRAFT

Filed Jan. 17, 1967  5 Sheets-Sheet 2

INVENTORS.
JOHN C. QUADY,
GEORGE H. SCHILLREFF,
By
L. E. Carnahan
AGENT.

July 2, 1968  J. C. QUADY ET AL  3,390,655
PATROL CRAFT
Filed Jan. 17, 1967  5 Sheets-Sheet 3

INVENTORS.
JOHN C. QUADY,
GEORGE H. SCHILLREFF,

By J. E. Carnahan
AGENT.

July 2, 1968  J. C. QUADY ET AL  3,390,655
PATROL CRAFT
Filed Jan. 17, 1967  5 Sheets-Sheet 4
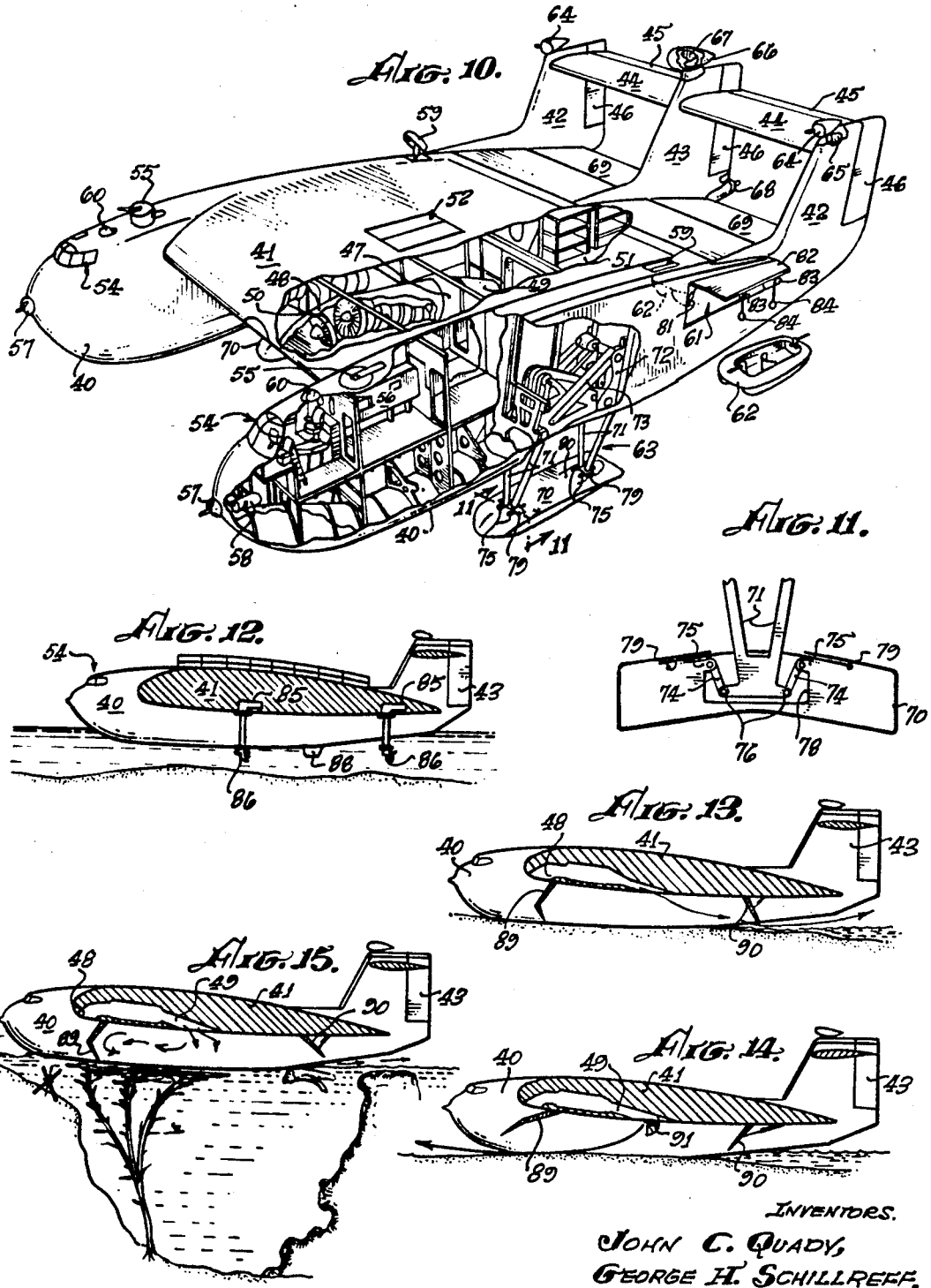
INVENTORS.
JOHN C. QUADY,
GEORGE H. SCHILLREFF,
By L. E. Carnahan
AGENT July 2, 1968  J. C. QUADY ETAL  3,390,655
PATROL CRAFT
Filed Jan. 17, 1967  5 Sheets-Sheet 5
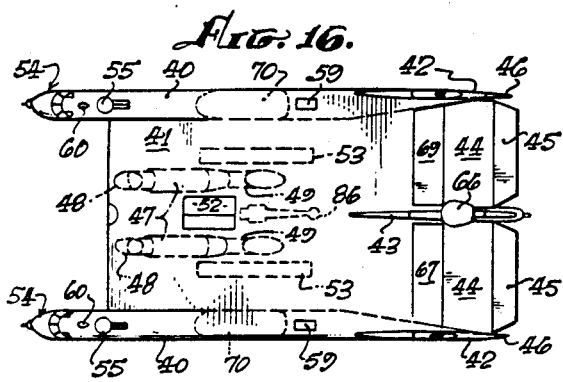
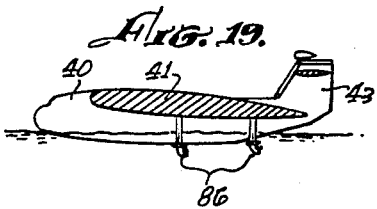
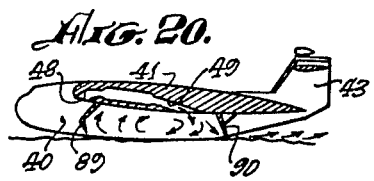
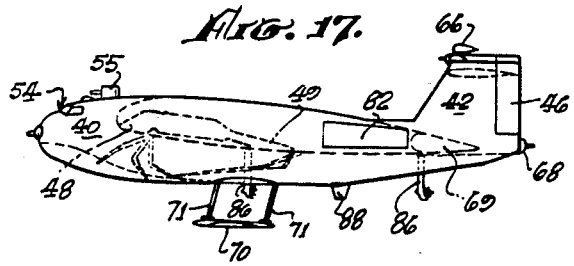
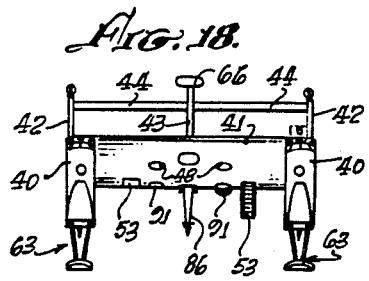
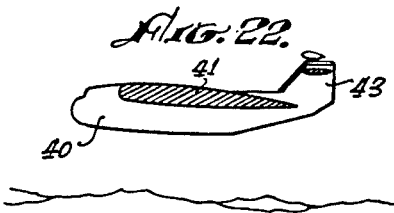
INVENTORS.
JOHN C. QUADY,
GEORGE H. SCHILLREFF,
BY L. E. Carnahan
AGENT.

United States Patent Office 3,390,655
Patented July 2, 1968

3,390,655
PATROL CRAFT
John C. Quady, Pomona, and George H. Schillreff, Glendora, Calif., assignors to General Dynamics Corporation, a corporation of Delaware
Filed Jan. 17, 1967, Ser. No. 609,801
12 Claims. (Cl. 114—1)

ABSTRACT OF THE DISCLOSURE

Broadly, the invention is directed to a patrol craft of the air-cushion sustained catamaran type, one embodiment additionally having low altitude flight capabilities. Basically, one embodiment of the patrol craft is generally composed of catamaran hulls connected by a bridge structure of airfoil shape which is adapted to accommodate a deck house, radar antenna and various armaments such as machine guns and missiles. The embodiment also includes nacelles with air intakes projecting above the deck house at a location substantially to the rear thereof from which appropriate ducting extends to provide air intake passages for turbines used to drive the craft and create the air-cushion for it. In addition, vanes are arranged in the ducting which accommodate the gas turbines for the purpose of either directing the air downwardly into the plenum chamber or allowing it to exhaust rearwardly to propel the craft. This arrangement affords versatility in operation since one set of vanes can completely close the by-pass chamber through which a component of the compressor air normally passes to direct said compressor air downwardly into the plenum chamber and allow the air discharging from the turbine to propel the craft while the vane located in the ducting to the rear of the turbine nozzle can be arranged to allow both the compressor by-pass air and turbine exhaust to pass rearwardly or direct a portion or all of this flow downwardly into the plenum chamber. Additional features disclosed include two pairs of differentially movable actuator controlled flaps hingedly mounted on the lower surface of the bridge section fore and aft which extend from one hull to the other to afford a seal for the plenum chamber when moved into appropriate position, auxiliary retractable out-drivers for additional propulsion and steering and various other control means such as dagger boards, rudders and fixed fins.

The other embodiment broadly is comprised of catamaran-like hulls connected by an airfoil shaped structure which additionally functions as a fixed wing during flight mode. A horizontal stabilizer is interposed laterally between the two hulls by a plurality of vertical stabilizers fixed to the rearward end of the hulls. The stabilizers are provided with movable elevators and rudders as required. A pair of reaction type engines are positioned in said airfoil structure and are designed to function in conventional thrust manner or with extendable flap members for producing an air-cushion sustained mode. The craft is provided with retractable foils utilized for taxi and take-off operations. In addition the craft is provided with missile and other armament, and equipped with small power boats and loading ramps for equipment or troops as well as quarters for the crew. The foils are provided with means which allow the foils to tip in a sidewise direction so that better operation can be obtained. In addition the craft is provided with retractable out-drives for maneuvering and low speed operation.

Background of the invention

This invention relates to patrol craft, particularly to patrol craft utilizing a catamaran configuration, and more particularly to patrol craft which can be operated under a water displacement mode, air-cushion sustained mode, and low altitude flight mode.

A requirement has long existed for a patrol craft capable of patrolling coastal waters in an efficient and economical manner and of providing offshore support in the suppression of activities on shore.

In view of this requirement a need was seen for a craft which possesses the following attributes:

(1) An ability to remain on station for long periods of time, which indicates that the craft could be capable of patrolling by relatively small auxiliary retractable inboard/outboard type drives (outdrives).

(2) A capability of entering and leaving a particular area at high speed over submerged reefs, sand bars, and shallow or debris laden water. The craft must possess sufficient power to run at high speeds and in high sea states for periods of time long enough to enable hit and run tactics.

(3) Have sufficient size so as to provide reasonable living accommodations for the crew for periods from one to several months and/or have the capability for transporting personnel and/or equipment for assault type landings.

(4) The ability to carry suitable armament, such as guns, deck launched torpedoes, missiles and appropriate radar and sonar devices, as required, and to employ the armament effectively.

(5) A capability of being beached and refloated under its own power thus eliminating the need of docking facilities.

(6) A flight capability provided by a fixed-wing having retractable means to lift the craft out of the water during take off.

Summary of the invention

The present invention provides the answer to each of the above requirements by providing an amphibious surface effect vehicle which, in one embodiment, additionally has low altitude flight capabilities.

Therefore, it is an object of this invention to provide a patrol craft having high speed capability combined with the ability to stay at sea for long periods of time.

A further object of the invention is to provide a patrol craft having the capability of entering and leaving a particular area at high speeds for activities such as landing assault troops or supplies.

A still further object of the invention is to provide a patrol craft having the capability of operating at high speed in shallow or debris laden water and riding over sand bars or submerged obstacles.

Another object of the invention is to provide a patrol craft of the catamaran surface effect type powered by a reaction type power plant.

Another object of the invention is to provide a patrol craft capable of carrying assault troops and/or equipment and landing same without the need of docking facilities.

Another object of the invention is to provide an airborne surface effect patrol craft having means for lifting the craft above the surface of the water during take-off.

Another object of the invention is to provide a patrol craft having a catamaran type hull interconnected by a fixed-wing member and a horizontal stabilized elevator.

Other objects of the invention, not specifically set forth above, will become readily apparent from the following description taken in connection with the accompanying drawings wherein:

Brief description of drawings

FIG. 10 is a view of another embodiment of the inventive patrol craft;

FIG. 11 is a view taken along the line 11—11 of FIG. 10 illustrating the mechanism intermediate the support struts and foils;

FIG. 12 is a partial cross-sectional view of the FIG. 10 craft in the displacement mode;

FIGS. 13, 14, and 15 are partial cross-sectional views of the FIG. 10 craft in the air-cushion mode;

FIG. 16 is a plan view of the FIG. 10 craft;

FIG. 17 is a side view of the FIG. 10 craft with certain portions illustrated in phantom;

FIG. 18 is a front view of the FIG. 10 craft showing one of the ramps in lowered position and one gun mount in phantom.

FIGS. 19-22 are cross-sectional views of the FIG. 10 craft in sequence of modes from displacement through air cushion, transition to flight.

Description of the embodiments

Figure 1:
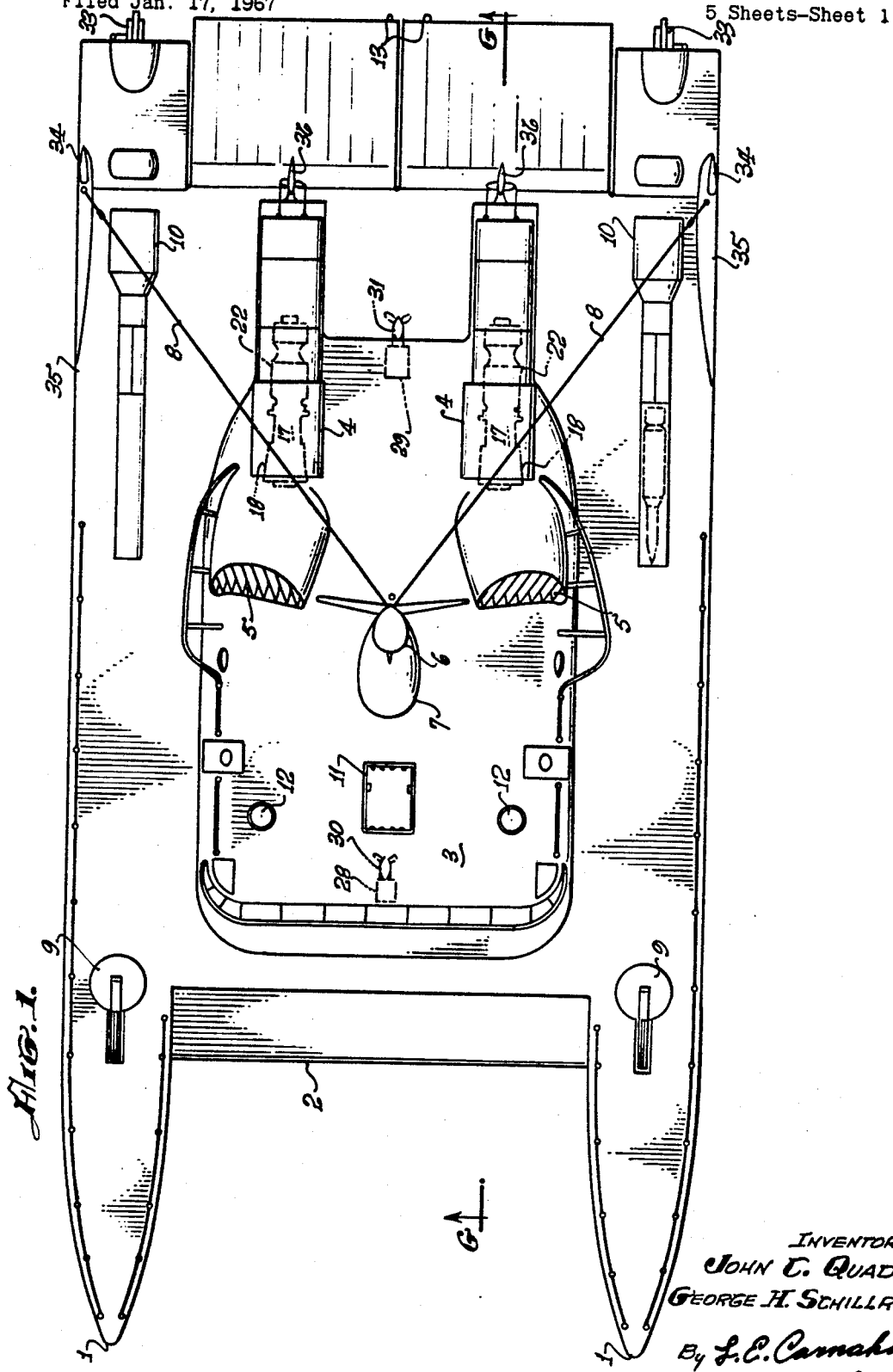
FIG. 1 is a plan view of a first embodiment of the inventive patrol craft.
Figure 2:
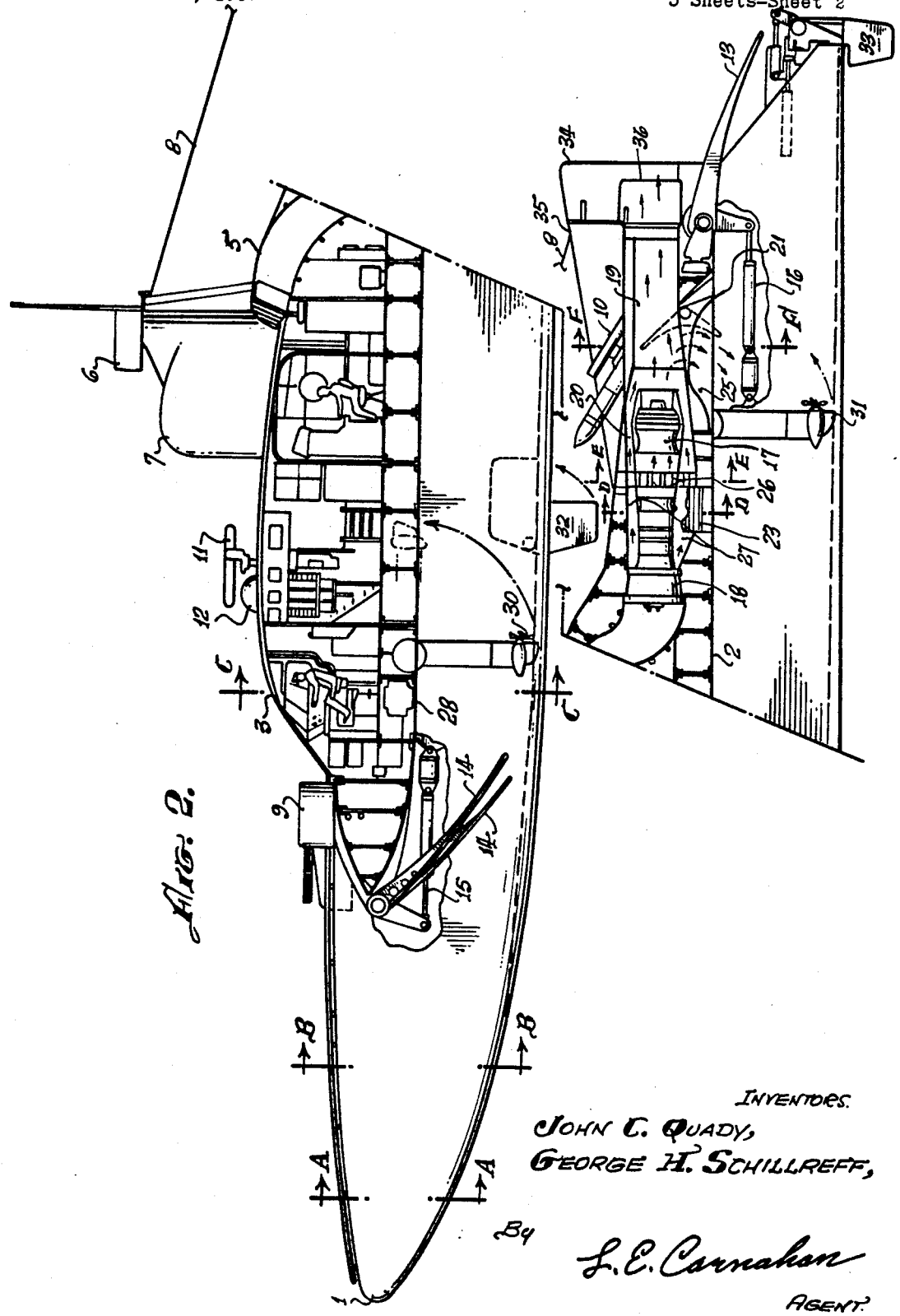
FIG. 2 is a side view of the craft taken on the line G—G of FIG. 1.
Figure 3:
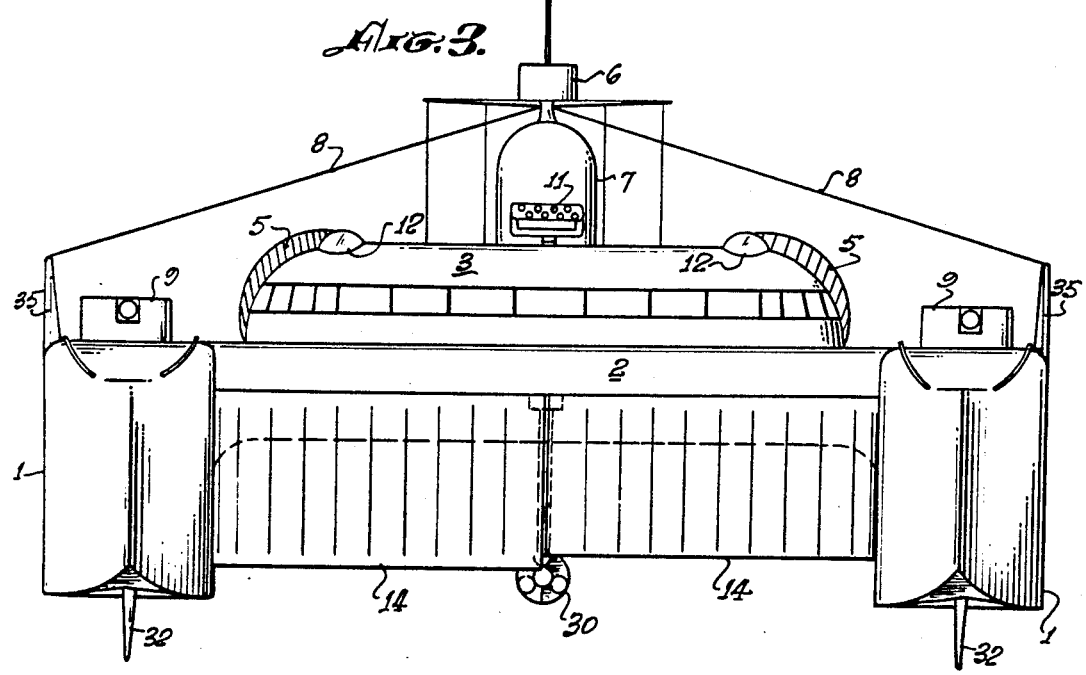
FIG. 3 is a front view of the FIG. 1 patrol craft.
Figure 4:
FIG. 4 is a cross-sectional view of one of the hulls taken along the lines A—A of FIG. 2.
Figure 5:
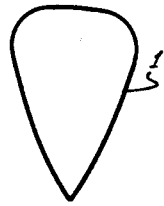
FIG. 5 is a cross-sectional view of one of the hulls taken along the lines B—B of FIG. 2.
Figure 6:
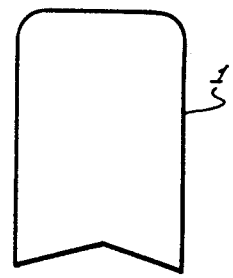
FIG. 6 is a cross-sectional view of one of the hulls taken along the lines C—C of FIG. 2.

Referring now to FIGS. 1-9, this embodiment constitutes an air cushion sustained catamaran type high speed patrol craft which additionally has low speed displacement mode capabilities. As seen in FIGS. 1-3, the craft includes a pair of hulls 1 conected by a bridge structure 2 whose general cross-section is that of an air foil or wing. On top of the bridge structure 2 and centrally located on center line is a streamlined deck house 3 in which the command, piloting, and weapons control operations are performed. Main engine nacelles 4 are located in the after deck portion of the deck house with air intakes 5 for the main engines 17, intakes 5 being mounted port and starboard, forward, and outboard of the upper aft end of the pilot portion of the deck house 3 as shown in FIGS. 1-3. Auxiliary, retractable outdrives 30 and 31 driven by engines 28 and 29, respectively, are located fore and aft, respectively, under wing-like bridge 2.

At the trailing edge of the bridge 2, a pair of differentially movable flaps 13, port and starboard, are positioned such that they just graze each other on the plane of symmetry and just graze the flat inside walls of the hulls 1 so as to effect an air seal. On the leading edge of the bridge 2 are a pair of flaps 14 which are also symmetrically disposed about the plane of symmetry and form a seal with the hull sides and each other and are independently movable. The flaps 13 and 14 are operated respectively by means of actuator mechanisms 16 and 15, port and starboard. FIG. 3 illustrates flaps 14 moved differentially wherein the port flap is elevated higher than the starboard flap. Retractable surfaces or dagger boards 32, rudders 33, fixed fins 35 and air rudders 34 and 36, each located port and starboard, comprise the steering group and are shown in FIGS. 1 and 2.

An antenna mast is located on the center line of the craft, approximately mid-ship and contains, for example, a search radar 6, guidance radar 7, both housed in a radome, and radio antennas 8. The craft is shown as mounting rapid fire machine guns 9, port and starboard, which are retractable into the hulls for drag reduction at high-speed or when not in use. Surface-to-surface guided missiles are mounted aft in retractable launchers 10, port and starboard, and may, for example, be of the type described and claimed in copending U.S. patent application Ser. No. 417,017 and assigned to the same assignee. In addition, a small anti-air guided missile launcher 11 is mounted on the center line forward of the radar units and is retractable into the roof of the pilot house structure 3. Observation bubbles 12 which contain optical sighting equipment are located on the pilot house 3, port and starboard.

Standard aircraft fan-jet gas turbine engines 17 provide the main propulsive means for the craft for maximum speed and high speed cruise operation. As shown in FIG. 2, the fan-jet engines 17 each include a forward fan portion 18 and the main jet or exhaust portion 22. While a forward fan type engine is illustrated, this invention contemplates the utilization of aft fan type engines or those with separately driven fans. The fan portion 18 of engine 17 is positioned so as to receive air via air intakes 5 as seen in FIG. 2. The fan-jet engine installation 17 makes use of a duct 19 which is the exhaust duct for the main jet portion 22 and the surrounding annular bypass jet which emanates from the bypass fan duct 20.

Figure 8:
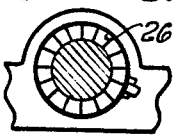
FIG. 8 is a view taken along the lines E—E of FIG. 2 illustrating the power plant air by-pass vanes in closed position.
Figure 9:
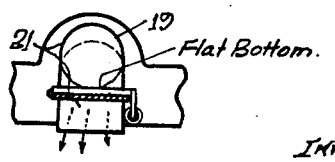
FIG. 9 is a view taken along the lines F—F of FIG. 2 illustrating the power plant exhaust deflection device in the deflecting position.

The installation described herein differs from the conventional installation in the following respects: An aft cross-sectional view along the lines F—F as shown in FIG. 9 illustrates the jet exhaust duct 19 which is generally circular but has a flat, square bottom in the region of a deflection vane 21. Deflection vane 21 rotates about a transverse axis, approximately coincident with the floor of duct 19. The curved vane 21 is shown in FIG. 2 by dotted lines in the partially open condition wherein gases from the jet stream are being deflected downwardly through the opening 25 which extends through the flat floor portion of the exhaust duct 19 and through the bottom of the winged bridge 2. The deflection vane 21 may be actuated by any conventional means such as a hydraulic mechanism. FIG. 8 shows a cross-section through the engine 17 where the fan jet air would enter in the bypass duct 20 from fan jet chamber 27. Extending radially between the engine shroud and the fan jet duct are vanes 26 shown in FIG. 8 in the closed position preventing the fan-jet air from passing into duct 20. FIG. 2 illustrates the vanes 26 in the open position. The vanes 26 are rotated in Venetian blind fashion in synchronism with each other so as to permit or to block the passage of air from the fan-jet chamber 27 to the bypass duct 20.

Figure 7:
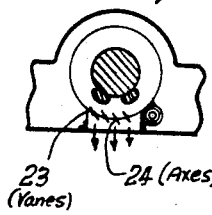
FIG. 7 is a view taken along the lines D—D of FIG. 2 illustrating the power plant air by-pass.

Vanes 23 shown in FIGS. 2 and 7 rotate about longitudinal axis 24, also in Venetian blind fashion and permit fan compressed air to escape from chamber 27 into a plenum chamber formed by the bottom of the bridge 22, the inside walls of hulls 1, the surface of the water, and flaps 13 and 14, port and starboard. By this arrangement of diverting and venting off the fan output separately from the main engine output, it is possible to divert compressed air from fan chamber 27 in the plenum chamber which will raise the craft up until the bottom of hulls 1 and flaps 13 and 14 are approximately even with the mean water surface. Main engine exhaust 22 is, in the meantime, delivering thrust and propelling the craft forward. By adjusting the position of vane 21 from the closed position, where the exhaust from the engine is exerting its full thrust to propel the craft forward, to a partially open position, wherein the main exhaust jet can be partially diverted into the plenum chamber below, thus augmenting the plenum pressure, but partially reversing the flow direction and reducing the main jet thrust from its maximum value. When the vane 21 is about half open, about half the flow is reversed and the net thrust drops essentially to zero. By opening vane 21 fully, all the flow is diverted to a forward and downward direction and the net thrust is negative. Thus, by differential and coordinated control of the two main jet engines together with vanes 21, steering, quick stopping and reversing of direction may be accomplished. In addition, the outputs of the two jet sources, fans 18 and main exhaust jets, may be used in conjunction with one another or independently to produce both a pressurizing flow into the plenum chamber and to produce thrust for forward propulsion of the craft.

Features which augment the steering capability of the FIGS. 1-9 craft in the high speed air-cushioned mode are the retractable dagger boards 32 located at the center of lateral resistance (approximately mid ship) on the center lines of the port and starboard hulls 1 and retractable rudders 33 located aft of the transoms on the port and starboard sides. When operating in rough seas at speeds above that required for ram air lift, the craft can be controlled so that it is essentially airborne during the periods it skips from wave top to wave top and the dagger boards 32 provide a means for lateral resistance to motion in a side wind and the water rudders 33 provide a means for giving directional stability to the boat in addition to that provided by the air rudders 34 and 36, fins 35 and differential thrust capability of the jet engines 17. In addition to the water rudders 33, the pairs of vestigal air rudders 34 extending from the pair of fixed fins 35, port and starboard, give a sufficient amount of aerodynamic directional stability to the craft. Fins 35 and air rudders 34 may be made as small or as large as is necessary for adequate directional stability. In addition to the air rudders 34 and fins 35, rudders 36 may be added on the center line of thrust of each of the main engines 36 so as to provide additional yawing moment by reacting with the exhaust flow of the engines 17. Due to the exhaust flow, this yawing moment capability can exist before high-speed has been reached. The controlling means for water rudders 33 and air rudders 34 and 36 may be synchronized and could, if desired, emanate from the same control action in a conventional manner.

Pitch control in the air-cushion mode is accomplished by movement of aft flaps 13 and forward flaps 14. Raising of aft flaps 13 cause a positive (nose up) pitching moment by moving the center of lift on the winged bridge 2 forward. Lowering flaps 13 produces a negative (nose down) moment by moving the center of lift aft. Although in the high speed air-cushion mode when ram air pressure is sufficiently high to allow raising forward flaps 14 into a stowed or faired condition, flaps 14 may nevertheless be lowered slightly to produce a nose up trimming moment to augment the action of the aft flaps 13 for optimum pitch control. Side winds or unbalanced fuel or cargo can produce rolling moments which in the air-cushion mode will cause one hull or the other to drag harder in the water. This can be compensated by slight differential movement of the flaps in the manner of airplane ailerons which will produce rolling moments to return the craft to a level condition.

The hull configuration of the FIGS. 1-9 patrol craft provides a sea-kindly behavior due to the chine lines, hull bottom, and bow configuration which are so designed as to take advantage of the sea-sled, air-cushion effect, as well as to permit a fine water entry. Referring to FIGS. 2 and 4-6, the bow lines originate with a fine cross-section and a slightly convex sharp V type entry (FIG. 4) which is intended to cut through the water with a minimum of spray. The inverted V originates where the chines begin just aft of the FIG. 5 section line of FIG. 2 and gradually widens to a maximum at the FIG. 6 section line, and then gradually disappears and becomes a flat bottom at the transom as shown in FIGS. 2 and 3. The inside surface of the hulls 1 are flat and vertical in the areas where the flaps 13 and 14 rotate as seen in FIG. 3 so as to facilitate an air seal between the flaps and hull. For ease and economy of construction, both of the hulls 1 are identical and symmetrical about their center line plane.

In the air-cushion operation, and starting from rest, vanes 23 which divert the flow of air from fan compartment 27 into the plenum are fully opened with vanes 26 fully closed, so as to provide sufficient pressure to raise the craft up to the surface of the water with the engines 17 at full throttle. Furthermore, when starting up, deflection vane 21 would be partially open so as to augment the flow from chamber 27 and provide increased pressurizing flow into the plenum chamber. As forward motion is achieved, deflection vane 21 would be gradually closed, thus permitting the full thrust from the main exhaust portion 22 via duct 19 to propel the craft, and vanes 26 would be gradually opened while vanes 23 would, in automatic synchronism, be gradually closed until all of the fan-jet output would be diverted aft through duct 20 to augment the main exhaust thrust from portion 22. This condition would be obtained when the boat had reached a speed such that the dynamic pressure presented to the plenum chamber beneath flaps 14 would equal that required to sustain the weight of the craft when considered in combination with the aerodynamic lift produced by the curved air foil upper surface of the bridge 2 and deck house structure 3. At this time, the flaps 14 could be fully raised and stowed in the position and the craft would be acting as a channel flow ram-air-cushion vehicle. From this speed upward, the required lift and longitudinal pitch attitude would be controlled by the degree of opening of the aft flaps 13 with pitch trim accomplished by the slight downward adjustment of the forward flaps 14.

The differential motion possible with both aft flaps 13 and forward flaps 14, if not stowed, would permit rolling moments to be applied to the craft, so as to provide aerodynamic roll control. Steering is accomplished by the several water and air surfaces acting synchronously by conventional actuating mechanisms. Rudder control motions could be accomplished, for example, by conventional rudder pedals, airplane fashion, which control the actuators. Likewise, pitch control from the forward and aft motion of an airplane-like control stick which would mount a half wheel for roll control, airplane fashion.

Provision can be made, if desired, for retracting the dagger boards 32 and retracting and decoupling the water rudders 33 for long, high-speed runs in calm weather, so as to reduce drag. In this condition the craft would be operating strictly in the air-cushion mode with steering accomplished entirely by the air rudders 34 and 36 and/or slight differential engine thrust for trimming.

In addition to the high speed jet propelled capability, an auxiliary means of propulsion is also provided for low speed cruising and for maneuvering in harbors and close quarters. This is accomplished by means of two relatively small identical auxiliary engines located forward and aft on the center line of the craft, indicated at 28 and 29 and connected to an out-drive 30 and 31, respectively, similar to the driveshaft and propeller arrangement of a conventional inboard/outboard motor. However, both out-drives 30 and 31 can swing upward 90° about a transverse axis, as indicated by the arrows in FIG. 2, such that they may each be stowed in a longitudinal direction in the bottom of winged bridge 2 as shown in phantom in FIG. 1. When lowered into driving position, both drives 30 and 31 are capable of being swiveled more than 360° about a vertical axis, thus making it possible for the thrust of the propellers to be delivered forward, backwards, sideways, or in any other direction, or in lateral opposing directions, so as to produce a couple which can rotate the boat about a vertical axis approximately through its midship section. In addition, the auxiliary outdrives 30 and 31 and their associated engines 28 and 29, which may operate on jet engine fuel, permit economical cruising at relatively low speed for long distances when high speed dash capability is not required. Under the low speed cruise condition while operating as a displacement craft, the static water line would appear approximately as in FIG. 2 wherein the forward flaps 14 are stowed horizontally and the aft flaps 13 would be placed in a horizontal "trail" position.

The patrol craft embodied in FIGS. 1-9 has the following advantages over known air-cushion type vehicles:

(1) Is a seaworthy, sea-kindly, catamaran type craft which can operate at low speeds as a displacement craft in rough seas, and has great lateral as well as longitudinal stability due to its beam-to-length ratio.

(2) Does not require complicated, large-size lifting fans and ducting or external air (or water) driven propellers for operation in the high speed air-cushion mode. Under moderate speeds, the craft operates partially as a planing craft and partially as an air-supported craft, due to the pressurized plenum.

(3) Has exceptional maneuverability which is achieved by providing retractable dagger boards which offer lateral resistance to turning, so that even while operating at high speeds in the air-cushion mode, down wind turns can be accomplished with reasonably short turning radii.

(4) Can use conventional forward or aft fan aircraft turbojet engines, such as the forward fan Pratt and Whitney JT3D-1 engine, without changes to the engines or their accessories and without additional fan drives or air pressure-producing equipment.

(5) Has exceptionally versatile maneuvering capabilities which are required in close quarters, such as in harbors and for docking, and in patrolling inshore waters, such as narrow river tributaries and inlets, due to the provision of the small outdrive power plant located on the center line, forward and aft.

(6) Possesses capability of carrying greater loads since it does not become a fully air-supported vehicle until it has reached a speed in which the ram air pressure under the winged bridge, in combination with the aerodynamic lift from the upper surface thereof, is sufficient to provide a lifting force equal to the weight of the craft, and since the craft derives a portion of its lift from the hydrodynamic planing lift on the hulls in the transition period.

(7) Deck space is available for mounting equipment or for carrying a larger deck house since the deck space is not used by large diameter forward thrust propellers, ducted fans and their associated drive mechanism.

(8) Provides a much higher speed capability due to the areodynamic lines of the craft.

(9) May be used as a conventional displacement craft to carry large loads of equipment or personnel on deck and below decks at speeds on the order of ten to fifteen knots, depending upon the power provided in the small auxiliary outdrive engines.

(10) Has high speed capabilities in the air-cushion mode when bucking high head winds due to the employment of jet engines whose thrust does not change appreciably with relative air velocity and owing to the fact that the higher relative air velocity will create a sufficient ram air pressure to provide adequate lifting force so as to reduce water drag to a negligible amount.

(11) Reduces the manufacturing expense by the elimination of the relatively complex and expensive ducting normally utilized.

Referring now to FIGS. 10–22, this embodiment constitutes a patrol craft which has in addition to the displacement and air-cushion modes of the FIGS. 1–9 embodiment, a low altitude flight mode. As seen in FIG. 10, the craft includes a pair of hulls 40, which may be, for example, of the same configuration as hulls 1 of the FIGS. 1–9 embodiment, connected by a bridge structure 41 which constitutes a fixed wing and has an air foil like cross-sectional configuration. Each of the hulls 40 is provided at the aft end with a vertical stabilizer 42 while another vertical stabilizer 43 is affixed to the bridge structure 41 on the centerline thereof. A pair of horizontal stabilizers 44 which include movable horizontal elevators 45 are interposed laterally between the vertical stabilizers 42 and 43. Each of the vertical stabilizers 42 and 43 are provided with movable rudders 46.

A pair of forward thrust producing fan-jet engines 47 are positioned within winged bridge 41 and receive air via intake ducts 48 which open under the leading edge of the bridge structure 41, as more clearly seen in FIGS. 13 and 18, and discharge via exhaust ducts 49. The engines 47 may be, for example, of the same type described above with respect to the FIGS. 1–9 embodiment. Positioned in each of the intake air ducts 48 is a deflection vane assembly 50 (only one shown) which may be of the variable type, and functions to direct the air into the intake of the engines 47.

The winged bridge 41 additionally is designed to include a crew's quarters indicated at 51, and a retractable missile launcher indicated at 52 and located intermediate engines 47, which may, for example, be of the type indicated at 10 in the FIGS. 1–9 embodiment and described in detail in the above referenced copending U.S. patent application. As seen in FIGS. 16 and 18, are a pair of retractable ramps 53 for loading and unloading purposes.

Each of the hulls 40 is provided with a pilot or control compartment 54, a retractable rapid fire machine gun 55 and associated ammo compartment 56, a nose mounted cannon 57 and ammo compartment 58, a retractable multi-round missile launcher 59, observation bubbles 60, a compartment generally indicated at 61 for a boarding boat 62, and a retractable foil or hydrodynamic lifting assembly generally indicated at 63.

Each of the vertical stabilizers 42 is provided with a gun 64 and ammo compartment 65, while vertical stabilizer 43 is provided with a radome 66 for a radar antenna 67 and a rearward facing gun 68.

A pair of control flaps 69 are operably attached at the rear of the winged bridge 41 and controlled by conventional mechanism as known in the art.

Each of the retractable foil or hydrodynamic lifting assemblies 63, as shown in FIG. 10, include a foil 70, two pair of support struts 71 pivotally mounted to support structure indicated at 72 and secured within the hull 40, and actuating mechanism indicated at 73, which may be controlled hydraulically or by other conventional means.

As shown in FIG. 11, each of the foils 70 is movably connected to each pair of struts 71 by linkage members 74 which are pivotally connected between flange portions 75 and flanges 76 of a base structure 77 which interconnects the struts 71 of each pair. The foils 70 include a chamber 78 which is of sufficient size to allow the mechanism 74–77 to move as the foil 70 is tipped sidewise with respect to the struts 71. A cover-plate or member 79 is fixed to struts 71 and is slidable within the skin of foil 70 as the foil moves with respect to the struts.

As seen in FIG. 10, foils 70 taper toward the aft end and have a slight curvature. Due to the taper of the foils, the aft mechanism for connecting the struts 71 with the foils 70 is partially located within a raised skin portion 80 of the foil so as to provide sufficient area for the interconnecting mechanism 74–77 to operate.

The boarding boat compartment 61 includes an actuator 81 for the door or lid 82 and a retractable support assembly indicated at 83 for block and tackle units 84 which are adapted to hook into cooperating members on the boarding boat 62 for lowering and/or raising same for storage within the compartment 61 as indicated in phantom lines.

As shown in FIGS. 12 and 16–19, the patrol craft is additionally equipped with auxiliary engines 85 which drive retractable outdrives 86 for low speed displacement mode operations, engines 85 and outdrives 86 being located along the center line of the craft with the outdrives extendable from the underside of the winged bridge 41. For example, the engines 85 may be of the 500 HP gas turbine type providing a cruising speed of about 14 knots for this mode, with a cruising range (ferry condition) of about 3000 nautical miles. Also, as shown in FIG. 12, the craft may be provided with removable guard rails 87 which may be used for retaining additional equipment and supplies for shipment by the water displacement mode.

In addition, as shown in FIGS. 12 and 17, the craft is provided with a retractable rudder 88 located at the center line of each of the hulls 40 and functions as described above with respect to the FIGS. 1-9 embodiment.

As can be seen in FIGS. 13-15, the patrol craft includes retractable flaps 89 and 90 located forward and aft on the underside of the bridge 41 and extend intermediate the hulls 40 to provide an air seal for the air-cushion mode of operation. The retractable flaps 89 and 90 may be of the same type and actuated by the same means and in the same manner as described above with respect to the FIGS. 1-9 embodiment. As described above each of the exhaust ducts 49 is provided with a deflection device 91 (see FIGS. 14 and 18) which functions to reverse the thrust from engines 47 and thus the direction of the craft as illustrated in FIGS. 13 and 14. As seen in FIG. 15, the craft has, in the air-cushion mode, the capability of moving over submerged objects and debris laden water.

In the air-cushion mode the FIG. 10 patrol craft is supported on a captured air bubble, which raises the hulls 40 of the craft virtually even with the surface of the water. This is accomplished by exhausting the output of the fan jet engines 47 into the plenum chamber. The plenum is formed by the underside of the wing or bridge 41, the inner surfaces of the hulls 40, and the forward and aft flaps 89 and 90. The craft can remain motionless, go backwards, forward, beach or debeach itself, etc., by raising or lowering the flaps 89 and 90 as indicated in FIGS. 13-15. A speed of about fifty knots can be attained in the air-cushion mode, with a corresponding range of about 300 nautical miles.

FIG. 19-22 illustrate a unique feature of the FIG. 10 patrol craft in showing its modes of operation from displacement of air-cushion to ski-foil or transition to ram wing or low altitude flight.

It is thus seen that, like the FIGS. 1-9 embodiment, the FIG. 10 embodiment of the inventive patrol craft provides a turbojet powered ocean catamaran that is (1) broad decked, (2) shallow draft, (3) extremely seaworthy, (4) highly maneuverable, (5) very fast, and (6) multi-purposed, while additionally have flight capability.

Thus this invention provides a patrol craft that has the capabilities to meet each of the above stated needs required for coastal water patrol and related activities.

While the invention has been illustrated and described as a military oriented craft, the craft can be utilized commercially by the removal of the weapon systems, and wherein cargo and passengers can be contained in the hull spaces and/or the upper deck house. Its broad beam and ample deck space and deck house structure can permit safe operation at speeds in excess of that possible with known air-cushion type craft.

Although particular embodiments of the invention have been illustrated and described, modifications will become apparent to those skilled in the art, and it is intended to cover in the appended claims all such modifications as come within the true spirit and scope of the invention.

What we claim is:

1. A patrol craft for at least water displacement and air-cushion operation modes including a pair of hulls interconnected by a bridge structure having an air-foil like cross sectional configuration, each of said hulls including a portion of the bottom thereof defining an inverted V which tapers to a substantially flat surface at the aft end thereof; reaction type propulsion means comprising a pair of gas turbine engines operatively positioned in said bridge structure for propelling the craft at high speeds, said reaction type propulsion means being operatively positioned in forward opening air intake duct assemblies; fore and aft retractable flap means operatively connected to said bridge structure, said fore and aft retractable flap means each comprising a pair of separately actuated flap members; means for moving said flap members; said flap members being constructed so as to define in the extended position thereof an air seal between said hulls and defining a plenum chamber beneath said bridge structure and intermediate said hulls; at least one control compartment for said craft; means for selectively directing air from said propulsion means into said plenum chamber, means for selectively directing exhaust gases from said propulsion means into said plenum chamber, said means for selectively directing exhaust gases being constructed so as to cause a reverse thrust condition upon selective activation thereof, means retractably mounted in said bridge structure for propelling said craft in a water displacement mode, said retractable propelling means comprising at least two outdrive assemblies operatively driven by auxiliary prime movers, means for controlling said craft in at least air-cushion mode, and retractable rudder means for providing directional stability to said craft in at least a water displacement mode.

2. The patrol craft defined in claim 1, wherein said pair of gas turbine reaction type propulsion means are of the bypass fan-jet type.

3. The patrol craft defined in claim 1, additionally including at least one missile launching mechanism retractably mounted in said craft.

4. The patrol craft defined in claim 1, additionally including dagger board means retractably mounted in the bottom of each of said hulls.

5. The patrol craft defined in claim 1, wherein said forward opening of said air intake duct assembly opens under the leading edge of said bridge structure.

6. The patrol craft defined in claim 1, wherein at least said pair of hulls are each provided with a vertical stabilizer assembly, a horizontal stabilizer assembly interposed between said vertical stabilizer assemblies, and control flap means operatively connected to the trailing edge of said bridge structure, whereby flight mode capability is provided.

7. The patrol craft defined in claim 6, wherein said at least one control compartment comprises at least one control station located in the forward end of each of said hulls.

8. The patrol craft defined in claim 6, wherein said bridge structure is constructed so as to provide a crew's quarters therein.

9. The patrol craft defined in claim 6, wherein each of said hulls is provided with a retractable hydrodynamic lifting assembly.

10. The patrol craft defined in claim 9, wherein said hydrodynamic lifting assemblies each include mechanism which allows foil portions thereof to tilt in a sidewise direction.

11. The patrol craft defined in claim 6, wherein at least one of said hulls includes a boat storage compartment and means for storing and removing an associated boat.

12. The patrol craft defined in claim 6, additionally including retractable ramp means operatively mounted in said bridge structure.

References Cited

UNITED STATES PATENTS

| | | | |
|---|---|---|---|
| 2,141,181 | 12/1938 | Geddes | 114—43.5 X |
| 2,735,391 | 2/1956 | Buschers | 114—1 |
| 3,141,436 | 7/1964 | Cathers et al. | 114—66.5 |
| 3,225,729 | 12/1965 | Ewing | 114—66.5 |
| 3,316,873 | 5/1967 | Dismukes | 114—61 |
| 3,330,240 | 7/1967 | Hardy et al. | 114—67 |
| 3,353,355 | 11/1967 | Jordan | 244—113 |

MILTON BUCHLER, *Primary Examiner.*

TRYGVE M. BLIX, *Examiner.*